United States Patent
Alabi et al.

(10) Patent No.: US 12,462,416 B2
(45) Date of Patent: Nov. 4, 2025

(54) ESTIMATING MISSING PLAYER LOCATIONS IN BROADCAST VIDEO FEEDS

(71) Applicant: STATS LLC, Chicago, IL (US)

(72) Inventors: Adedapo Alabi, Cincinnati, OH (US); Matthew Scott, Chicago, IL (US); Patrick Joseph Lucey, Chicago, IL (US)

(73) Assignee: STATS LLC, Chicago, IL (US)

( * ) Notice: Subject to any disclaimer, the term of this patent is extended or adjusted under 35 U.S.C. 154(b) by 441 days.

(21) Appl. No.: 17/930,571

(22) Filed: Sep. 8, 2022

(65) Prior Publication Data

US 2023/0070051 A1 Mar. 9, 2023

Related U.S. Application Data

(60) Provisional application No. 63/261,050, filed on Sep. 9, 2021.

(51) Int. Cl.
*G06T 7/70* (2017.01)
*G06T 7/292* (2017.01)

(52) U.S. Cl.
CPC ............... *G06T 7/70* (2017.01); *G06T 7/292* (2017.01); *G06T 2207/10016* (2013.01); *G06T 2207/20081* (2013.01); *G06T 2207/20084* (2013.01); *G06T 2207/30196* (2013.01); *G06T 2207/30221* (2013.01)

(58) Field of Classification Search
None
See application file for complete search history.

(56) References Cited

U.S. PATENT DOCUMENTS

| | | | |
|---|---|---|---|
| 2008/0192116 A1 | 8/2008 | Tamir et al. | |
| 2016/0314818 A1* | 10/2016 | Kirk | G06F 3/04845 |
| 2017/0128814 A1 | 5/2017 | Ianni et al. | |
| 2020/0279131 A1 | 9/2020 | Sha et al. | |

(Continued)

FOREIGN PATENT DOCUMENTS

| | | |
|---|---|---|
| WO | 2021247371 A1 | 12/2021 |
| WO | 2022103236 A1 | 5/2022 |

OTHER PUBLICATIONS

Patton et al., "Predicting NBA Talent from Enormous Amounts of College Basketball Tracking Data" (Year: 2021).*

(Continued)

*Primary Examiner* — Chan S Park
*Assistant Examiner* — Promotto Tajrian Islam
(74) *Attorney, Agent, or Firm* — Bookoff McAndrews PLLC

(57) ABSTRACT

Examples disclosed herein may estimate locations of players not visible in a sporting broadcast video. A prediction model may be generated based on a training data set of in-venue tracking data that includes locations of all players at all times and the corresponding broadcast tracking data that may not necessarily contain the locations of all players at all times. The prediction model may be based on an algorithmic logic (e.g., a spline regression) or machine learning model (e.g., k-nearest neighbor, deep neural network). The generated predicted model may be used to estimate the unknown locations of players in broadcast tracking based on the known locations.

17 Claims, 19 Drawing Sheets

(56) References Cited

U.S. PATENT DOCUMENTS

2022/0156500 A1* 5/2022 Yoon ................... G06V 10/751
2023/0237801 A1* 7/2023 Fang ..................... G06V 20/42
345/419

OTHER PUBLICATIONS

PCT International Application No. PCT/US22/42931, International Search Report and Written Opinion of the International Searching Authority, dated Dec. 29, 2022, 9 pages.

* cited by examiner

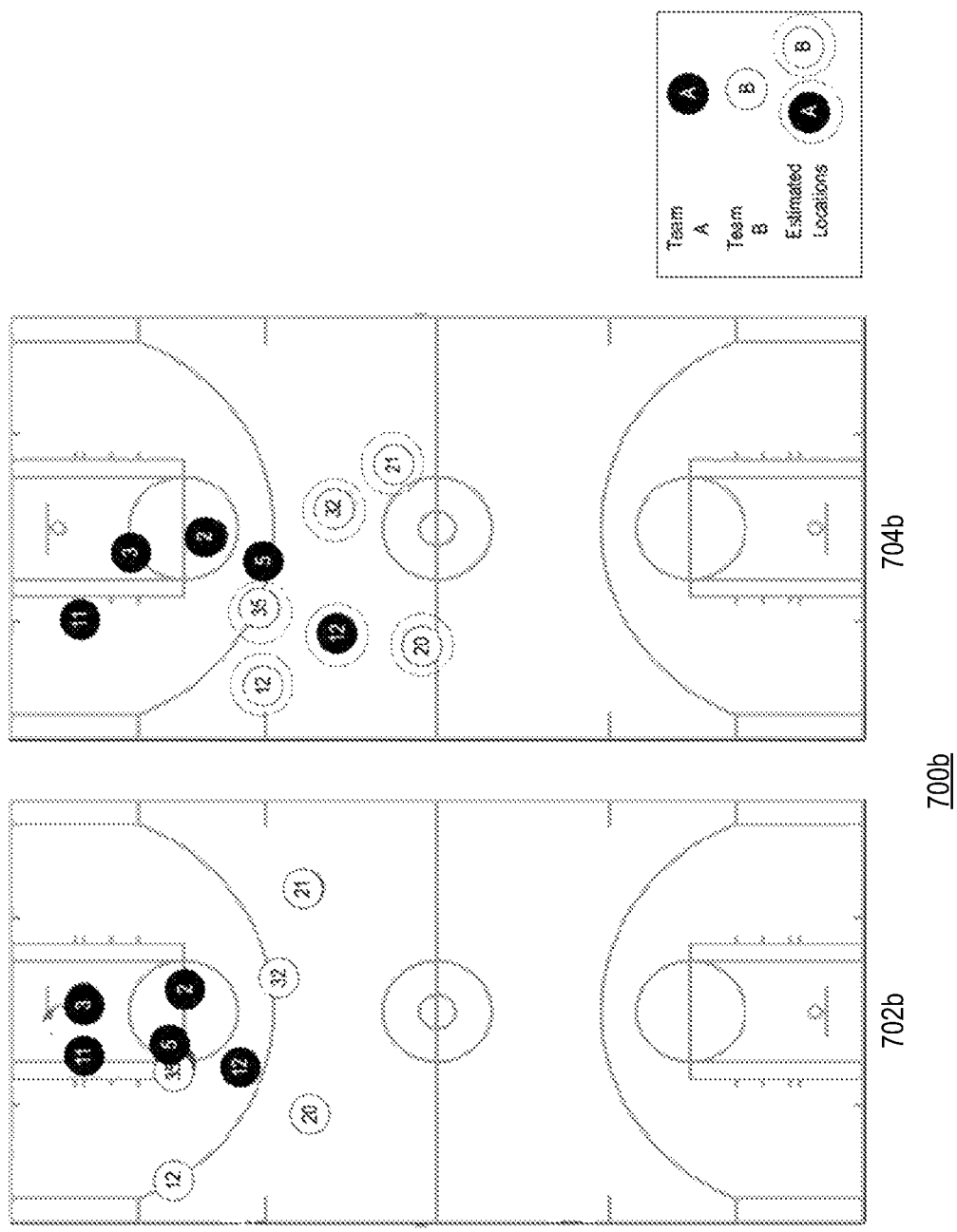

ESTIMATING MISSING PLAYER LOCATIONS IN BROADCAST VIDEO FEEDS

CROSS-REFERENCE TO RELATED APPLICATIONS

This application claims priority to U.S. Application Ser. No. 63/261,050, filed Sep. 9, 2021, which is hereby incorporated by reference in its entirety.

FIELD OF THE DISCLOSURE

The present disclosure generally relates to systems and methods of estimating, for broadcast feeds of sporting events, locations of players that are not in view.

BACKGROUND

Sports analytics may use locations of players in a game to calculate statistical measurements such as possession percentage of each team. The locations of the players may be used for analyzing the effectiveness of game strategy and tactics. However, in a typical video feed of a game, all the players may not be visible all the time. The camera may zoom into where the main action is and show the players closer to the action, while leaving out the strategic locations of other players.

SUMMARY

In some embodiments, a method is disclosed herein. A computing system may receive a broadcast video of a sporting event. The computing system may determine that, in the broadcast video, a subset of players is not visible at a first point in time and are visible at a second point in time. The computing system may then estimate, using a prediction model and based on known locations of the players at the second point in time, unknown locations of the subset of players at the first point in time.

In some embodiments, a system is disclosed herein. The system includes a processor and a memory. The memory has programming instructions stored thereon, which, when executed by the processor, causes the system to perform operations. The operations may include receiving a broadcast video of a sporting event. The operations may further include determining that, in the broadcast video, a subset of players is not visible at a first point in time and are visible at a second point in time. The operations may also include estimating, using a prediction model and based on known locations of the players at the second point in time, unknown locations of the subset of players at the first point in time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 7B illustrates an exemplary updated visualization of in-venue tracking and broadcast tracking, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Conventional player tracking techniques are confined to "in-venue" tracking. Cameras or other optical sensors are provided in a sports venue to observe all the players at all the time to generate tracking data based on full visibility all the time. This technique, while useful for tracking with a dedicated camera system, may not work for tracking players in video broadcasts, where all players are visible not all the time.

Examples disclosed herein attempt to solve the aforementioned technical problems and describe estimating locations of players not shown in portions of video feed of sporting events. For instance, a sporting event (e.g., basketball) video broadcast may not show all the players all the time and instead focus on the players near the ball. The examples herein describe estimating the unknown player locations based on the known locations. For live broadcasts, the known locations may be before the players go out of the view and the examples herein estimate locations of the out of view players. For recorded broadcasts, the known locations may be both before the players go out of view and after the players come into the view, and the examples herein estimate the locations of the players when they are out of view.

Although the examples herein are generally described in terms of a basketball game with ten players in the court, this is just for illustration and the examples should apply to any form of sporting event. Furthermore, examples disclosed herein may be applied to any video feed (broadcast and live video feeds are described below as examples), which may include video feed from in venue tracking systems, video feed generated by any type of moving camera (e.g., during a broadcast), or video feed generated by wearable devices. Therefore, using these examples, missing player locations may be calculated regardless of the type and origin of the video feed.

Figure 1:
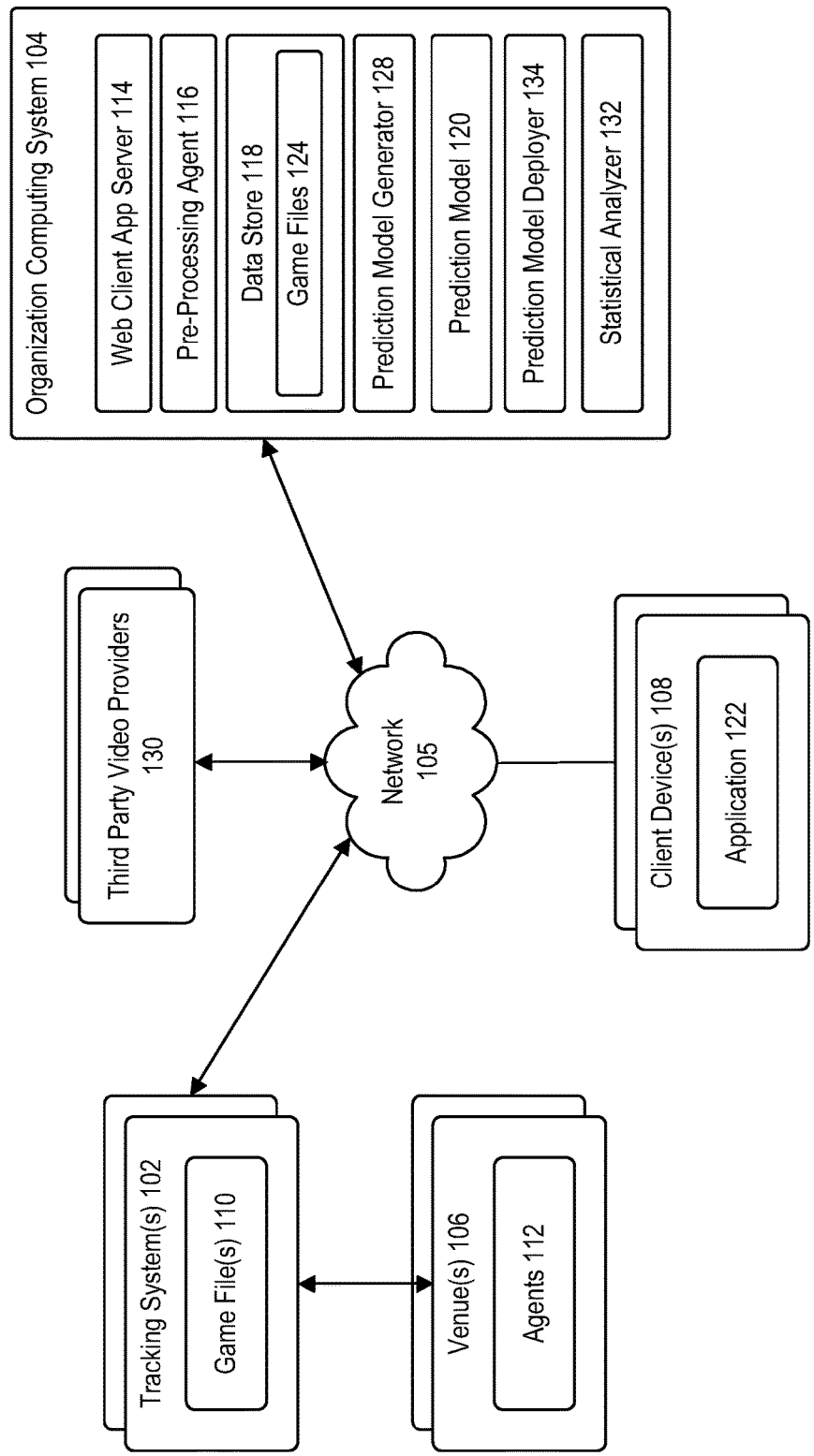
FIG. 1 is a block diagram illustrating a computing environment, according to example embodiments.

FIG. 1 is a block diagram illustrating a computing environment 100, according to example embodiments. Computing environment 100 may include tracking system 102, organization computing system 104, one or more client devices 108, and one or more third party video 130 providers all communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be at a venue 106 (e.g., a basketball court). For example, venue 106 may be configured to host a sporting event (e.g., a basketball match) that includes one or more agents 112. Tracking system 102 may be configured to capture the motions of all agents (e.g., basketball players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional spatial locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.). In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. Organization computing system 104 may be configured to manage and analyze the data captured by tracking system 102 and further manage and analyze data received from third party video providers 130. Organization computing system 104 may include at least a web client application server 114, a pre-processing agent 116, a data store 118, a prediction model 120, a prediction model generator 128, a prediction model deployer 134, and a statistical analyzer 132. One or more of these components may comprise software modules that may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The software modules may also include one or more hardware components. One or more aspects of an example algorithm may be performed by the hardware components (e.g., circuitry) itself, rather as a result of the instructions.

Data store 118 may be configured to store one or more game files 124. Each game file 124 may include video data of a given match. For example, the video data may correspond to a plurality of video frames captured by tracking system 102. In some embodiments, the video data may correspond to broadcast data of a given match, in which case, the video data may correspond to a plurality of video frames of the broadcast feed of a given match. The broadcast feed may be received from the third party video providers 130. Other examples of video data may include video recording of a broadcast feed.

Pre-processing agent 116 may be configured to process data retrieved from data store 118. For example, pre-processing agent 116 may be configured to generate game files 124 stored in data store 118. For example, pre-processing agent 116 may be configured to generate a game file 124 based on data captured by tracking system 102. In some embodiments, pre-processing agent 116 may further be configured to store tracking data associated with each game in a respective game file 124. Tracking data may refer to the (x, y) coordinates of all players and balls on the playing surface during the game. In some embodiments, pre-processing agent 116 may receive tracking data directly from tracking system 102. In some embodiments, pre-processing agent 116 may derive tracking data from the broadcast feed of the game, received from the third party video providers 130. The tracking data derived from the third party video providers 130 may not have a complete picture of all the players in the game. For instance, such tracking data may only show the locations of players closer to action, i.e., closer to the ball because broadcast video feeds may not necessarily show players who are not close to the ball. An example situation of missing player locations may include knowing the locations of all the players at the start of a possession and again at the end of the possession, but not knowing the locations of all the players during the possession. Another example situation of missing player locations may include knowing the locations of all players during the possession but not knowing the location of all players at the start or at the end of the possession.

Prediction model 120 may be trained/generated (e.g., by the prediction module generator 128) to estimate the locations of players in the tracking data for the broadcast (either live or recorded video feeds). For the situations where the locations of the players are known at the start and at the end of the possession with missing locations during the possession, the prediction module 120 may use a spline model to interpolate the missing locations. For the situations where the locations of players are not known at the start and/or at the end of the possessions but known during the possession, the prediction model 120 may use a nearest neighbor approach. It should however be understood that these approaches/algorithms are merely provided as examples, and other approaches/algorithms of estimating locations should also be considered within the scope of this disclosure.

Prediction model deployer 134 may use prediction model 120 to predict the unknown locations of the players in the video feed provided by the third party video providers 130. Based on the predicted locations, statistical analyzer 132 may generate various statistics and metrics associated with the game. An example metric may include expected point value in a basketball game. Another example metric may include the possession percentage for each team in the basketball game.

Client device 108 may be in communication with organization computing system 104 via network 105. Client device 108 may be operated by a user. For example, client device 108 may include a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least one application 122. Application 122 may be representative of a web browser that allows access to a website or may be a stand-alone application. Client device 108 may use application 122 to access one or more functionalities of organization computing system 104. Client device 108 may communicate over network 105 to request a webpage, for example, from web client application server 114 of organization computing system 104. For example, client device 108 may be configured to execute application 122 to access the predicted locations generated by the prediction model deployer 134. Alternatively or additionally, the client device 108 may execute the application 122 to retrieve the statistics and metrics generated by statistical analyzer 132. The content that is displayed to client device 108 may be transmitted from web client application server 114 to client device 108, and subsequently processed by application 122 for display through a graphical user interface (GUI) of client device 108.

Figure 2:
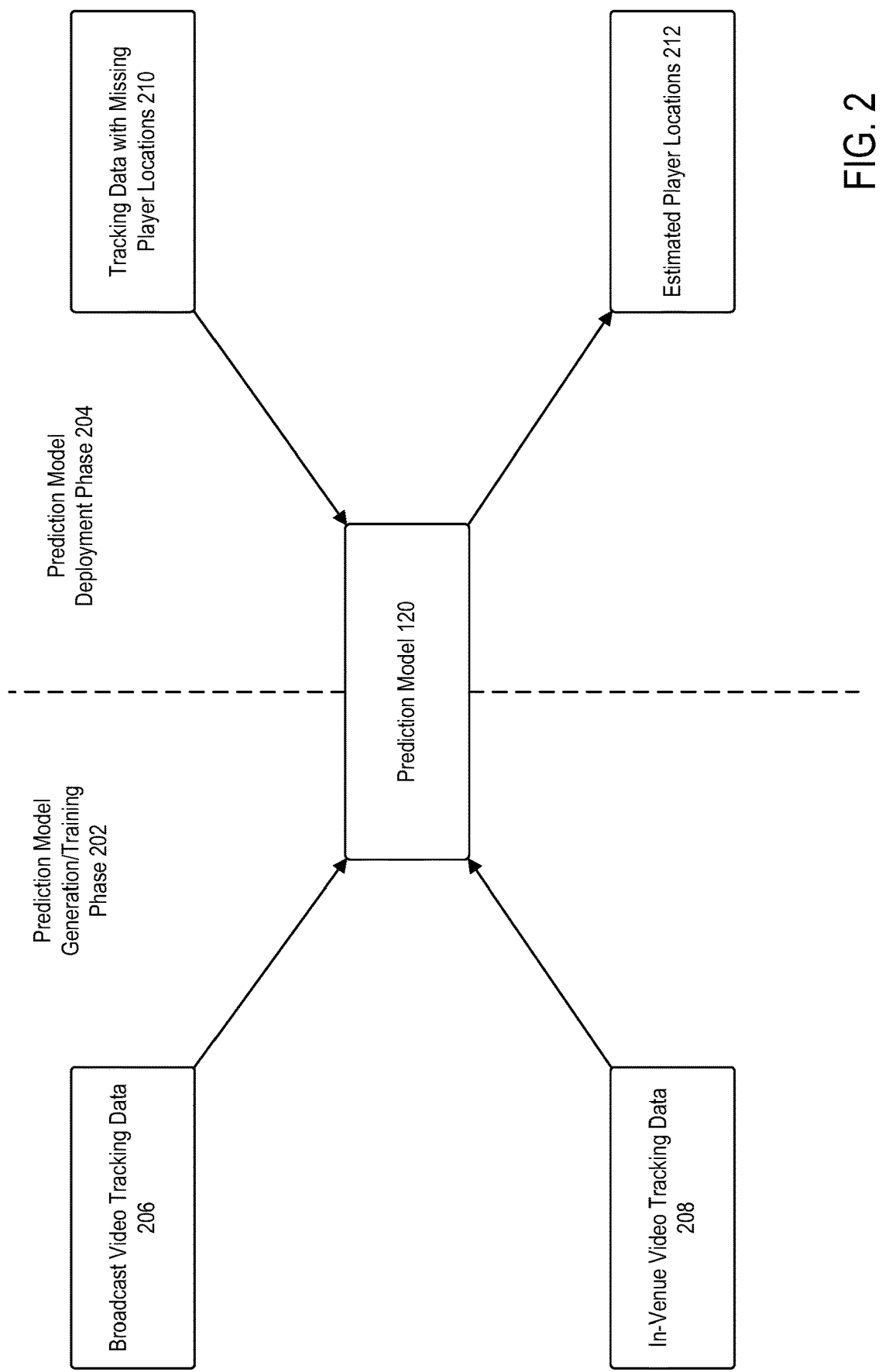
FIG. 2 is a block diagram illustrating prediction model, according to example embodiments.

FIG. 2 is a block diagram illustrating prediction model 120, according to example embodiments. As described above, prediction model 120 may be generated/trained by the prediction model generator 128 during a prediction model generation/training phase 202. The prediction model 120 may then be used by prediction model deployer 134 during a prediction module deployment phase 204.

During the prediction model generation/training phase 202, prediction model 120 may be generated/trained using a difference between broadcast video tracking data 206 (it should be understood that the broadcast video tracking data may include tracking data from a live broadcast or a recorded broadcast) and in-venue video tracking data 208 for the same matches. As an example, a basketball game may be captured and digitized using the tracking system 102; and a broadcast video feed for the same game may be digitized. In some examples, the broadcast video feed may not have the locations of all the players throughout the broadcast. In other words, while in-venue video tracking data 208 for the basketball game may have the locations of all ten players on the court for the basketball game, broadcast video tracking data 206 may have players moving in and out of view—as is typically the case in broadcasts of sporting events.

In some embodiments, the prediction model 120 may be generated/training based on tracking data grouped according to the different possessions during the game. During each possession, a typical broadcast video may generally show the player with the ball and the players nearby defending the possession or trying to offensively change the possession. The broadcast video may not generally show the locations of other players who may be strategically located in other areas of the court, for example, to receive a long pass or to defend against a particularly vulnerable possession in case of a sudden attack. In other instances, the video may show close-up shot of players to catch their reactions, without necessarily showing the entirety of the court. Generally, the broadcast may use different camera angles and capture other facets of the game (other than just showing the entirety of players in the court) to keep the audience engaged for these different possessions.

In some embodiments, the broadcast video may show the location of all the players at the start of the possession and again at the end of the possession. During the possession, there may be a rotation of the players in the view: some players may come into view while other players may go out of the view as the broadcast video tracks the ball. In these cases, a spline model may be used to estimate the missing locations of the players during the possession, interpolating the known locations at the start of the possession and the known locations at the end of the possession. The spline model may comprise an algorithmic logic to generate the prediction model 120, and/or may use a machine learning model to reduce the error rates between the spline model estimate and the actual location in the in-venue video tracking data. The machine learning model may include, in some examples, an end to end deep neural network.

In some embodiments, the broadcast video may not show the locations of all the players at the start and/or at the end of the possession. At the start of the possession, for instance, the players may be strategically spread throughout the court guarding the corresponding locations. At the end of the possession, which may be the start of the next possession, the players may similarly spread throughout the court. However, during the possession, all the players may be close to the ball and therefore in view of the video. Therefore, the broadcast video tracking data may be missing the locations of the players at the start and/or at the end of the possession, but may have the locations during the possession. In these cases, the prediction model 120 may be trained using a nearest neighbor approach (e.g., a k nearest neighbor (kNN) model) using the difference between the locations of the in-venue video tracking data and broadcast video tracking data. The kNN may estimate the most likely starting and/or end locations of the players based on their known locations during the possession and/or based on their role during the possession.

During the prediction model deployment phase 204, the prediction mode 120 may be used to estimate unknown locations in a video feed. A tracking data with missing player locations 210 may be provided to the prediction model 120. The tracking data may have been generated from a live broadcast video feed of a game. Alternatively or additionally, the tracking data may have been generated from a recorded broadcast video feed. Regardless of the type of the video feed generating the tracking data, the prediction model 120 may estimate the unknown locations 212 of the players. In some examples, the prediction model 120 may use the spline model to estimate player location during a possession from the known locations at the start and the end of the possession. In other example, the prediction model 120 may use a neural network (e.g., a kNN and/or a deep neural network) to estimate the likely locations 212 of players at the start and/or at the end of the possession based on the known locations during the possession.

For real-time or live video feeds, the tracking data with missing player locations 210 may be augmented by human generated event feed. The human generated live event feed may include context information such as possession, injury (taking a player out the game), and any other type of information associated with the game. The prediction model 120 may use this context information along with the tracking data with missing player locations 210 to estimate unknown locations 212 of the players.

The estimated player locations 212 may then be used by statistical analyzer 132 to generate various statistics and metrics of game such as possession percentage for both teams.

Figure 3:
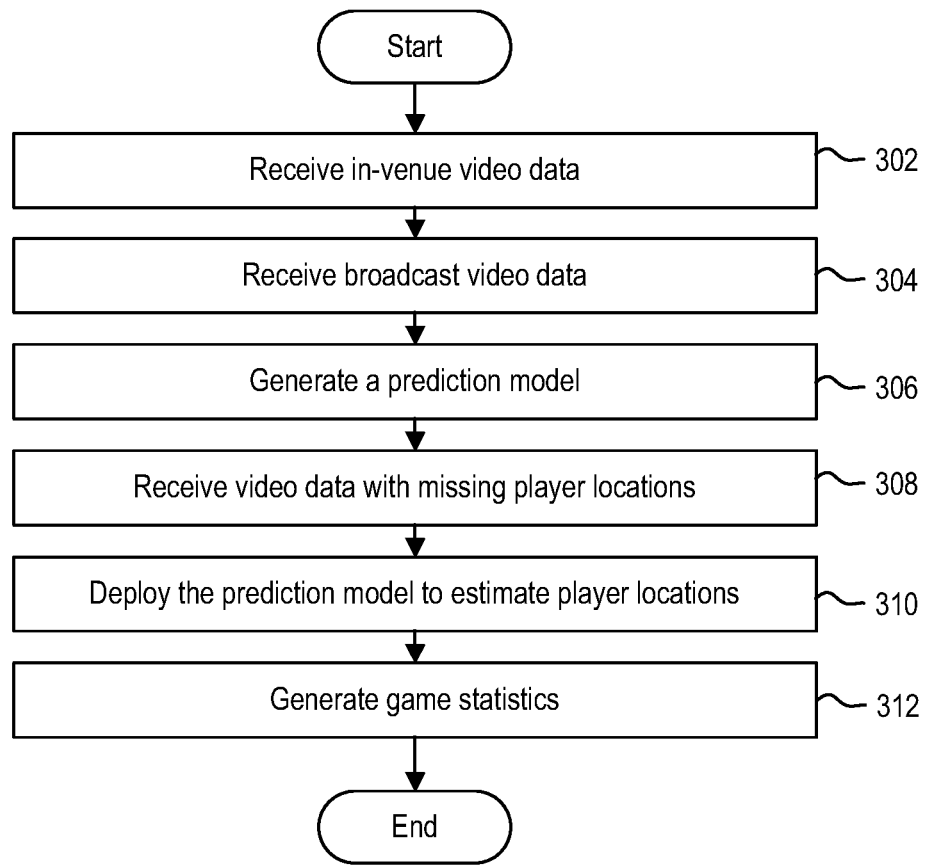
FIG. 3 is a flow diagram illustrating a method of estimating player locations in broadcast tracking, according to example embodiments.

FIG. 3 is a flow diagram illustrating a method 300 for estimating unknown locations of a players in a broadcast feed, according to example embodiments. One or more components of the computing environment 100 may execute the different steps of the method 300. It should also be understood that the shown steps of the method 300 are merely examples and other methods with additional, alternative, or fewer number of steps should also be considered within the scope of this disclosure.

The method 300 may begin at step 302, where in-venue video data may be received. The in-venue video data may include tracking data generated from the video feeds captured by one or more cameras in the venue of the game. For instance, a set of cameras with different views of a basketball court may be used; and the videos taken by the set of cameras may be processed to track the locations of the players (and other entities such as the ball and the referee) in the game. In other words, the in-venue video data may have the complete locations of the players during the different possessions of the game.

At step 304, broadcast video data may be received. The broadcast video data may include tracking video data generated from a broadcast video. The broadcast video may comprise a live broadcast or a recorded broadcast. The broadcast video data may correspond to the in-venue video data received in step 302. That is, in-venue video data and the broadcast video data for the same games may be received at steps 302 and 304, respectively, to generate a prediction model in the subsequent steps.

At step 306, a prediction model may be generated, based on the in-venue video data (received at step 302) and the broadcast video data (received at step 304). For the broadcast video data where the locations of the players are known at the start of and at the end of a possession, the prediction model may include a spline model. The spline model may estimate the unknown locations of the players during the possession based on the known locations at the start of and at the end of the possession. The spline model may use algorithmic logic for this estimation. Additionally or alternatively, the spline model may use a machine learning model (e.g., a deep neural network) to minimize the error rate between the estimated location in the broadcast video data and the actual location in the in-venue video data.

For the broadcast video data where the locations of players are not known at the start and/or at the end of possessions but are known during the possession, a prediction model using a machine learning model (e.g., kNN, end-to-end deep neural network) may be used. The machine learning model may learn to estimate the location based on the player roles (e.g., shooting guard or a power forward in a basketball game) and their known locations prior to and/or after the unknown locations.

At step 308, a video data with missing player locations may be received. The video data may include tracking data from a broadcast video (or a recorded broadcast video). The video data may not necessarily include locations of all players at all time during the different possessions of the game, because of the above described idiosyncrasies of game broadcasts.

At step 310, the unknown locations in the received video data may be estimated by deploying the prediction model. For example, the prediction model may use spline model and/or one or more neural networks to estimate the locations, based on which part of the possession is associated with unknown locations.

At step 312, game statistics may be generated using the known and the estimated locations. The game statistics may include, for example, possession percentage, expected point value, etc.

Figure 4:
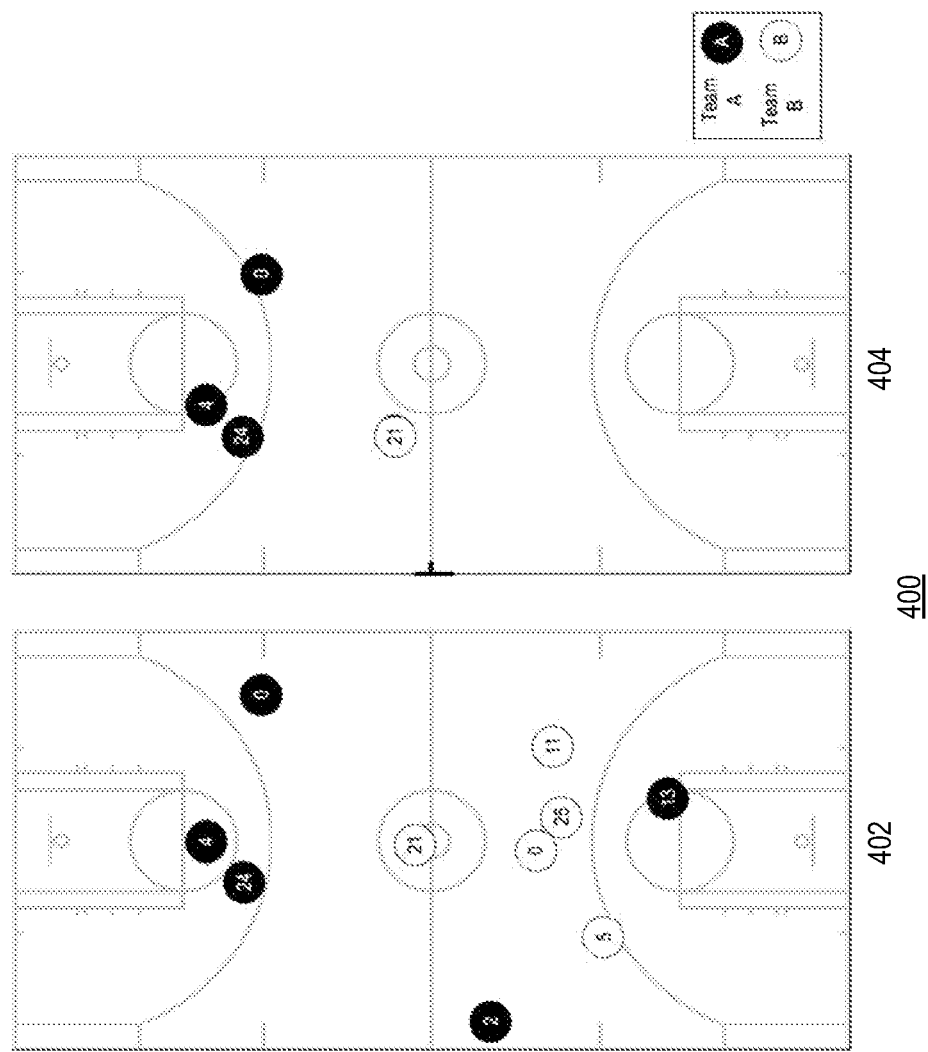
FIG. 4 illustrates an exemplary visualization of in-venue tracking and broadcast tracking, according to example embodiments.

FIG. 4 illustrates an exemplary visualization 400 of an in-venue tracking 402 and corresponding broadcast tracking 404, according to example embodiments. In some examples, the visualization 400 may be presented as a graphical user interface, e.g., by the application 122 in the client device 108). In other examples the visualization 400 may represent the state of the tracking data that is being processed organization computing system 104. The visualization 400 may be for any state of the game. As shown, the in-venue tracking 402 shows the locations of all 10 players in the court. More specifically, the locations of all players from Team A (0, 2, 4, 13, and 24) and locations of all players from Team B (0, 5, 11, 21, 25) are shown. However, the broadcast tracking shows the locations of only three players (0, 4, and 24) of Team A and only one player (21) of Team B. The examples disclosed herein may estimate the missing locations from the broadcast tracking using the prediction model 120.

FIGS. 5A-5D illustrate visualizations showing missing player locations in a broadcast tracking, particularly missing player locations during a possession, according to example embodiments. The illustrated visualizations 500a-500d show a progress of the possession for in-venue tracking 502a-502d and corresponding broadcast tracking 504a-504d. The visualizations 500a-500d may be presented as graphical user interfaces and/or may be representative of the state of the tracking data being processed.

Figure 5A:
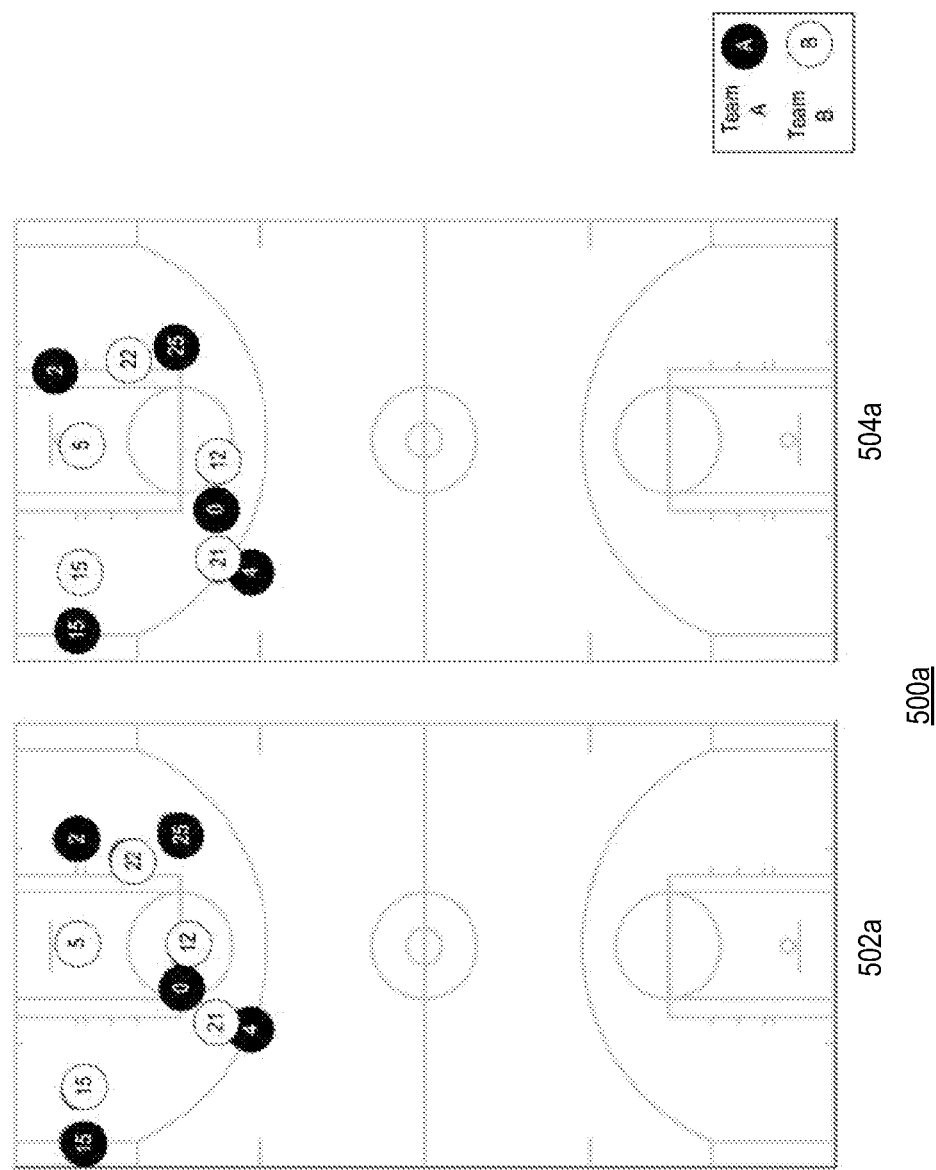
FIG. 5A illustrates an exemplary visualization of in-venue tracking and broadcast tracking, according to example embodiments.
Figure 5B:
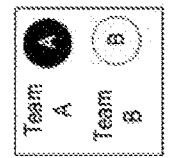
FIG. 5B illustrates an exemplary updated visualization of in-venue tracking and broadcast tracking, according to example embodiments.
Figure 5B:
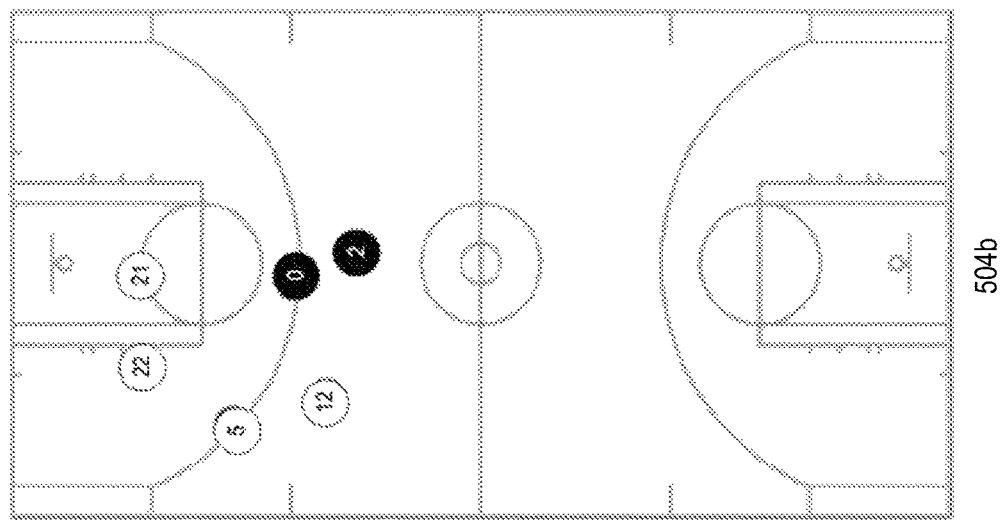
Figure 5B:
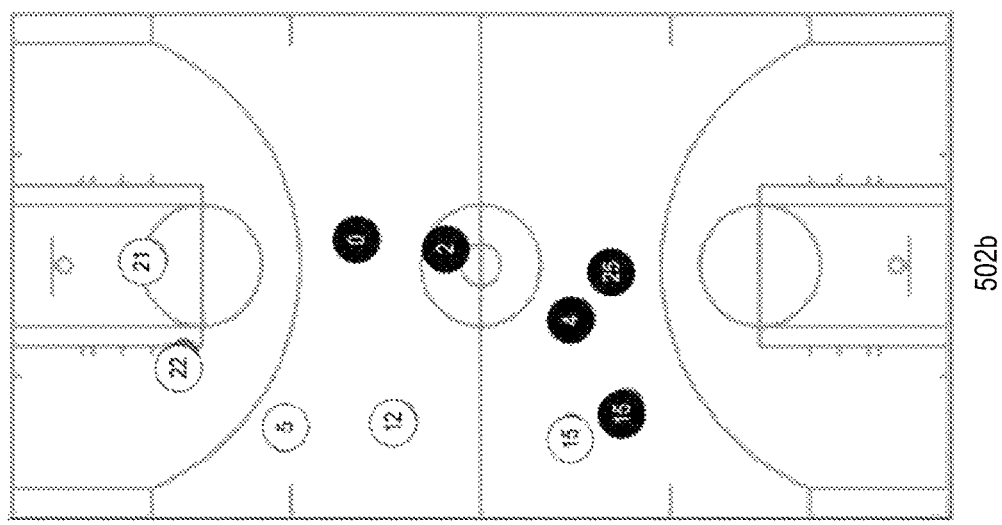
Figure 5C:
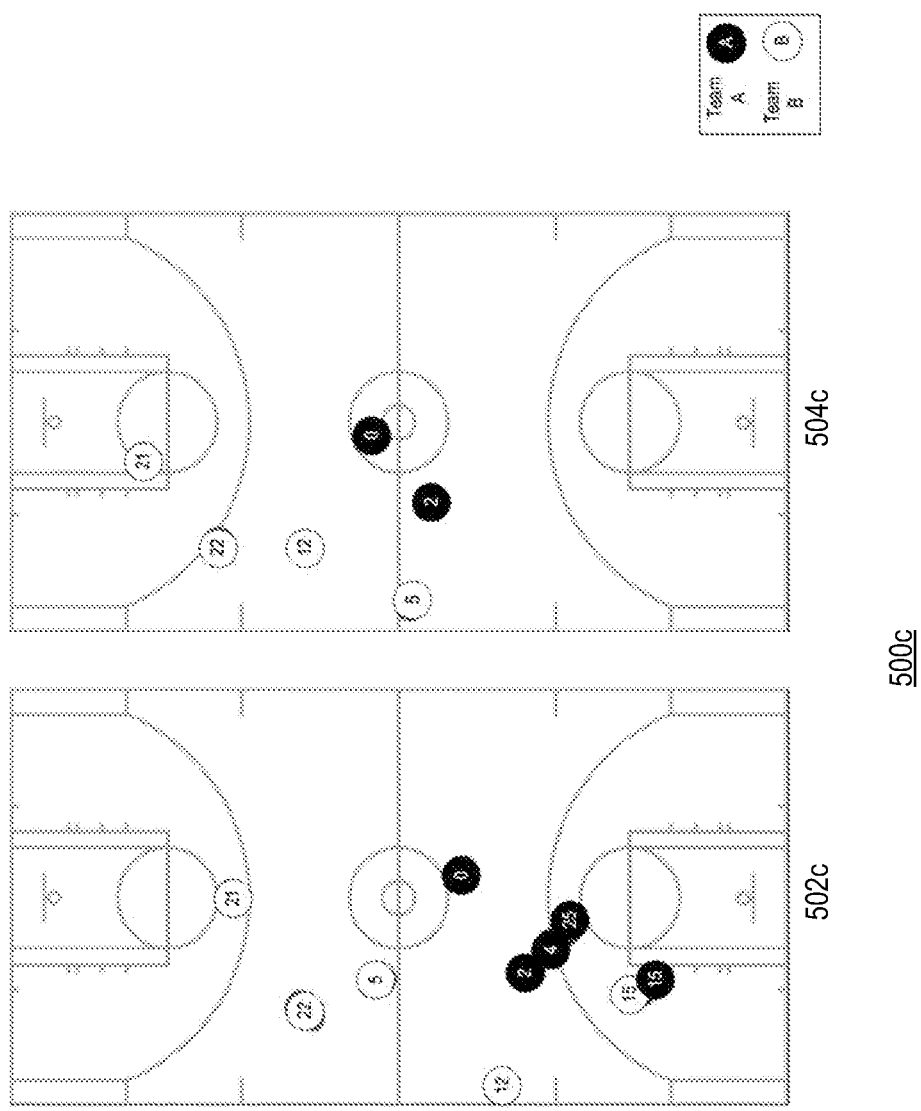
FIG. 5C illustrates an exemplary updated visualization of in-venue tracking and broadcast tracking, according to example embodiments.
Figure 5D:
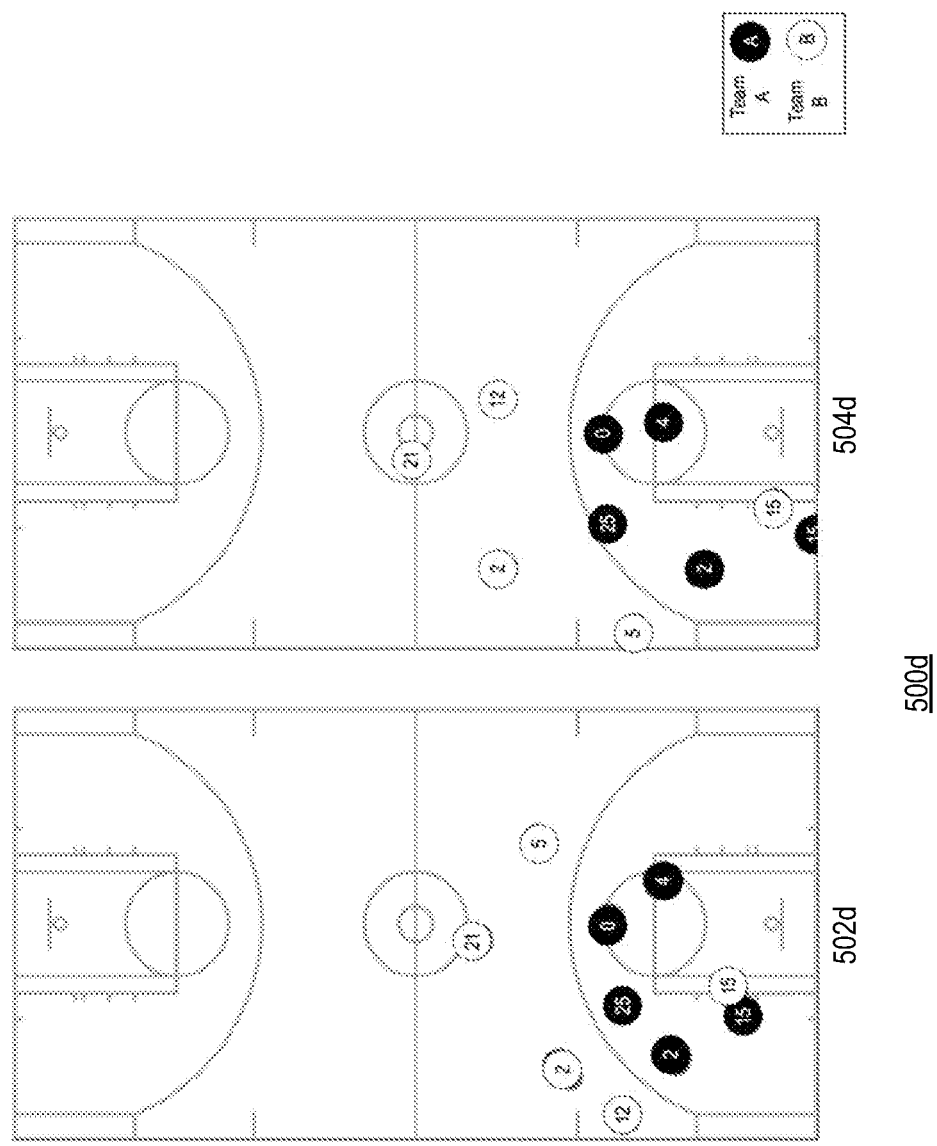
FIG. 5D illustrates an exemplary updated visualization of in-venue tracking and broadcast tracking, according to example embodiments.

FIG. 5A illustrates the visualization 500a at the start of a possession. At the start, both the in-venue tracking 502a and the broadcast tracking 504a have the locations of all ten players: Team A (0, 2, 4, 15, and 25) and Team B (5, 12, 15, 21, and 22). In the updated visualization 500b shown in FIG. 5B, the updated in-venue tracing 502b has locations of all ten players during the possession. However, the updated broadcast tracking 504b does not have locations of all the players: missing are the locations of players of Team A (4, 15, and 25) and Team (15). In the updated visualization 500c illustrated in FIG. 5C showing the locations of the players during possession, the updated in-venue tracking 502c still has the location of all ten player and the updated broadcast tracking 504c still missing the locations of players of Team A (4, 15, and 25) and Team B (15). FIG. 5D illustrates an updated visualization 500d at the end of the possession. Both the updated in-venue tracking 502d and the updated broadcast tracking 504d have the locations of the all the players. Examples disclosed herein may use the prediction model 120 to estimate the missing locations of the players in the broadcast tracking 504b and 504c, based on the locations of the players in in-venue tracking 502a-502d and broadcast tracking 504a and 504d.

Figure 6A:
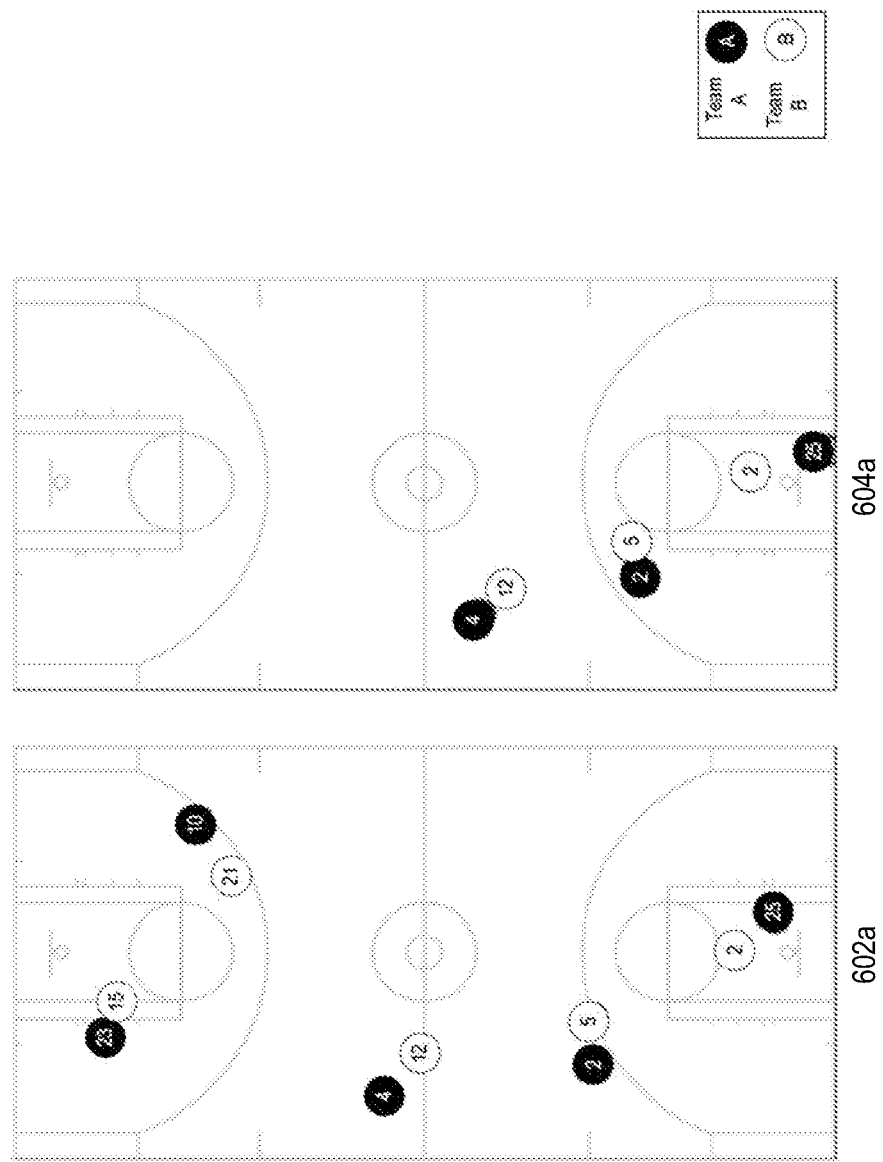
FIG. 6A illustrates an exemplary visualization of in-venue tracking and broadcast tracking, according to example embodiments.
Figure 6B:
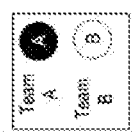
FIG. 6B illustrates an exemplary updated visualization of in-venue tracking and broadcast tracking, according to example embodiments.
Figure 6B:
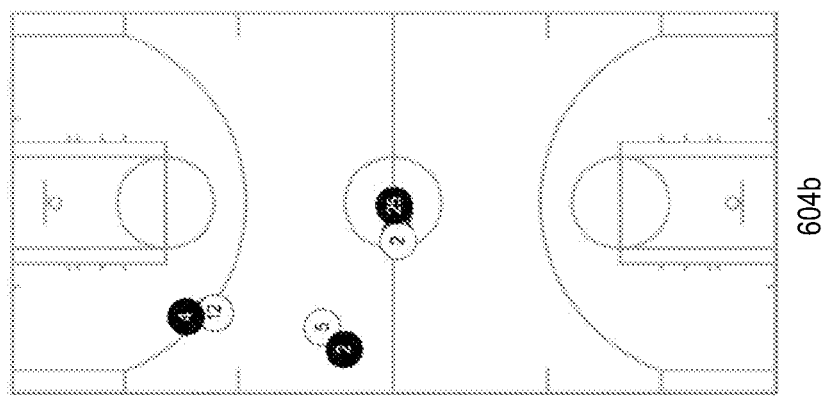
Figure 6B:
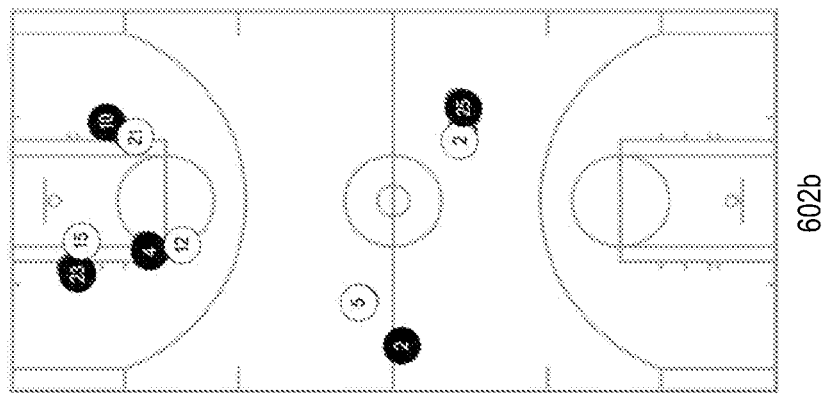
Figure 6C:
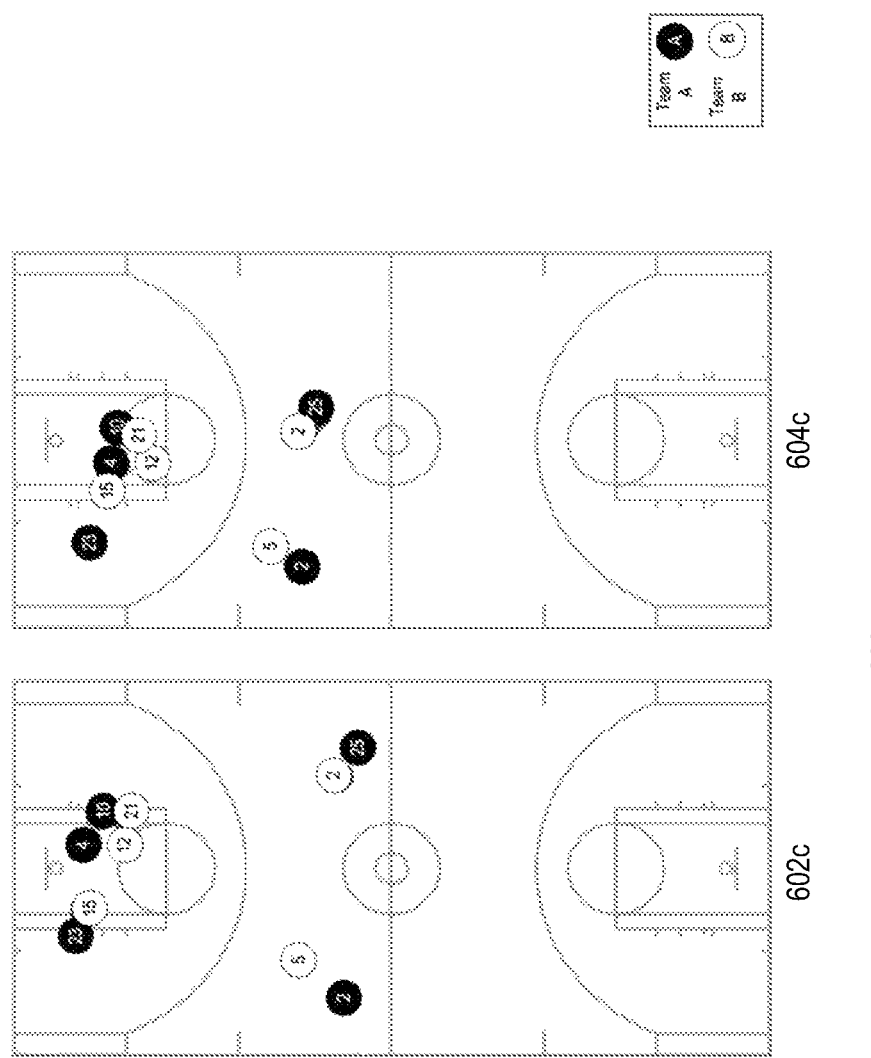
FIG. 6C illustrates an exemplary updated visualization of in-venue tracking and broadcast tracking, according to example embodiments.

FIGS. 6A-6C illustrate exemplary visualizations with missing player locations in a broadcast tracking, particularly missing player locations at a start of and/or at an end of the possession, according to example embodiments. The illustrated visualizations 600a-600c show a progression for in-venue tracking 602a-602c and corresponding broadcast tracking 604a-604c. As above, the visualizations 600a-600c may be presented as graphical user interfaces and/or may be representative of state of tracking data being processed.

FIG. 6A illustrates the visualization 600a at the start of a possession. At this state, the in-venue tracking 602a has the location of all ten players, but the broadcast tracking 604a has the locations of only 6 players: missing are the locations of players of Team A (10, 23) and Team B (15, 21). FIG. 6B illustrates the updated visualization 600b during the possession, wherein the updated in-venue tracking 602b has locations of all players and the updated broadcast tracking is still missing the players: Team A (10, 23) and Team B (15, 21). FIG. 6C illustrates the visualization 600c at the end of the possession. At this point, both of the updated in-venue tracking 602c and the updated tracking 604c show the locations of all players. Examples disclosed herein may estimate the missing locations of the players in broadcast tracking 604a and 604b based on the in-venue tracking 602a-602c and broadcast tracking 604c.

FIGS. 7A-7D illustrate exemplary visualizations with estimated player locations for broadcast tracking, according to the example embodiments. Particularly, FIGS. 7A-7D illustrate visualizations 700a-700d showing a progression of player locations from a start of a possession to an end of the possession. In-venue tracking 702a-702d show the actual locations of the players and corresponding broadcast tacking 704a-704d show the actual known locations of the players and the estimates of the unknown locations. As above, the visualizations 700a-700d may be presented as graphical user interfaces and/or may be representative of state of tracking data being processed.

Figure 7A:
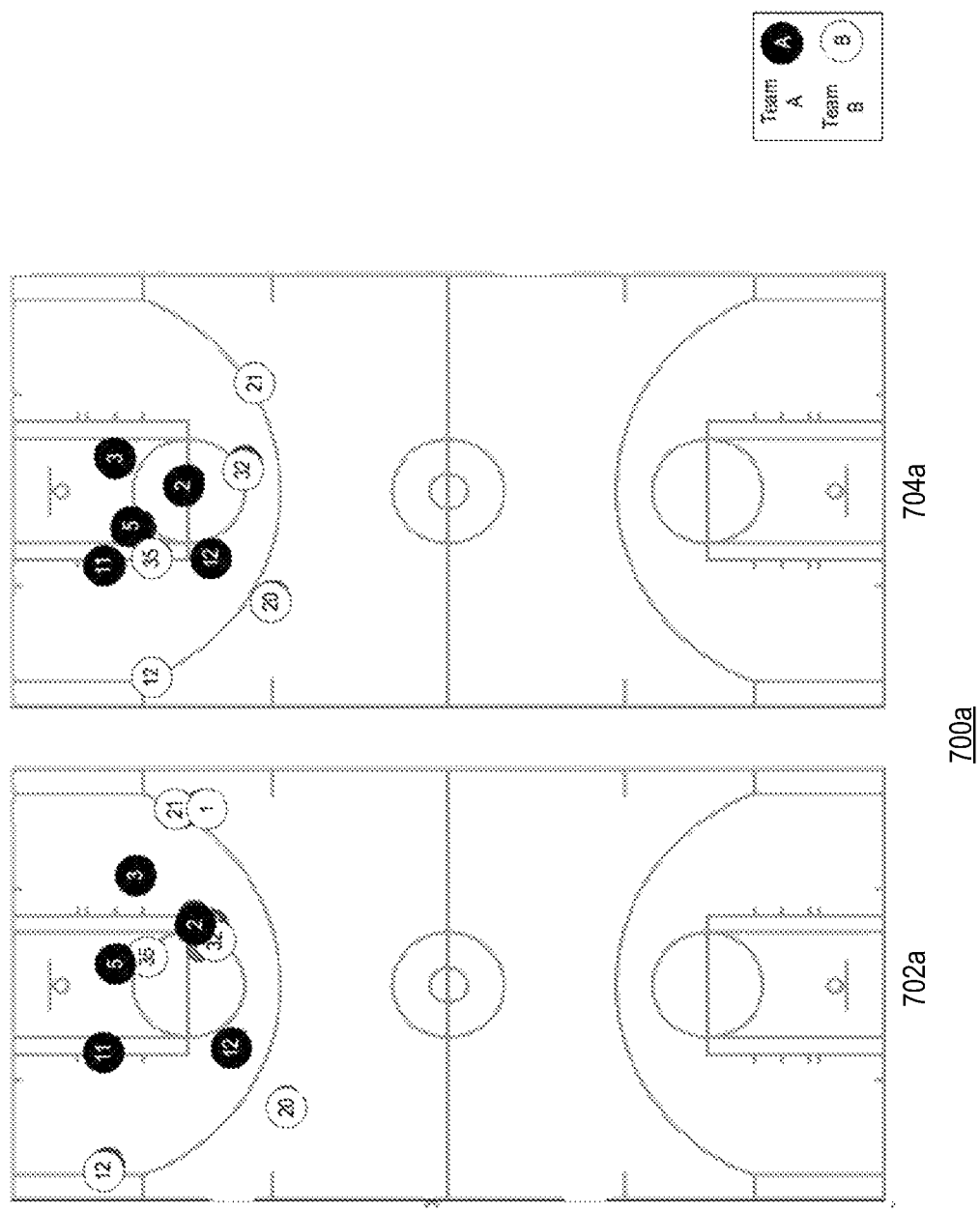
FIG. 7A illustrates an exemplary visualization of in-venue tracking and broadcast tracking, according to example embodiments.
Figure 7C:
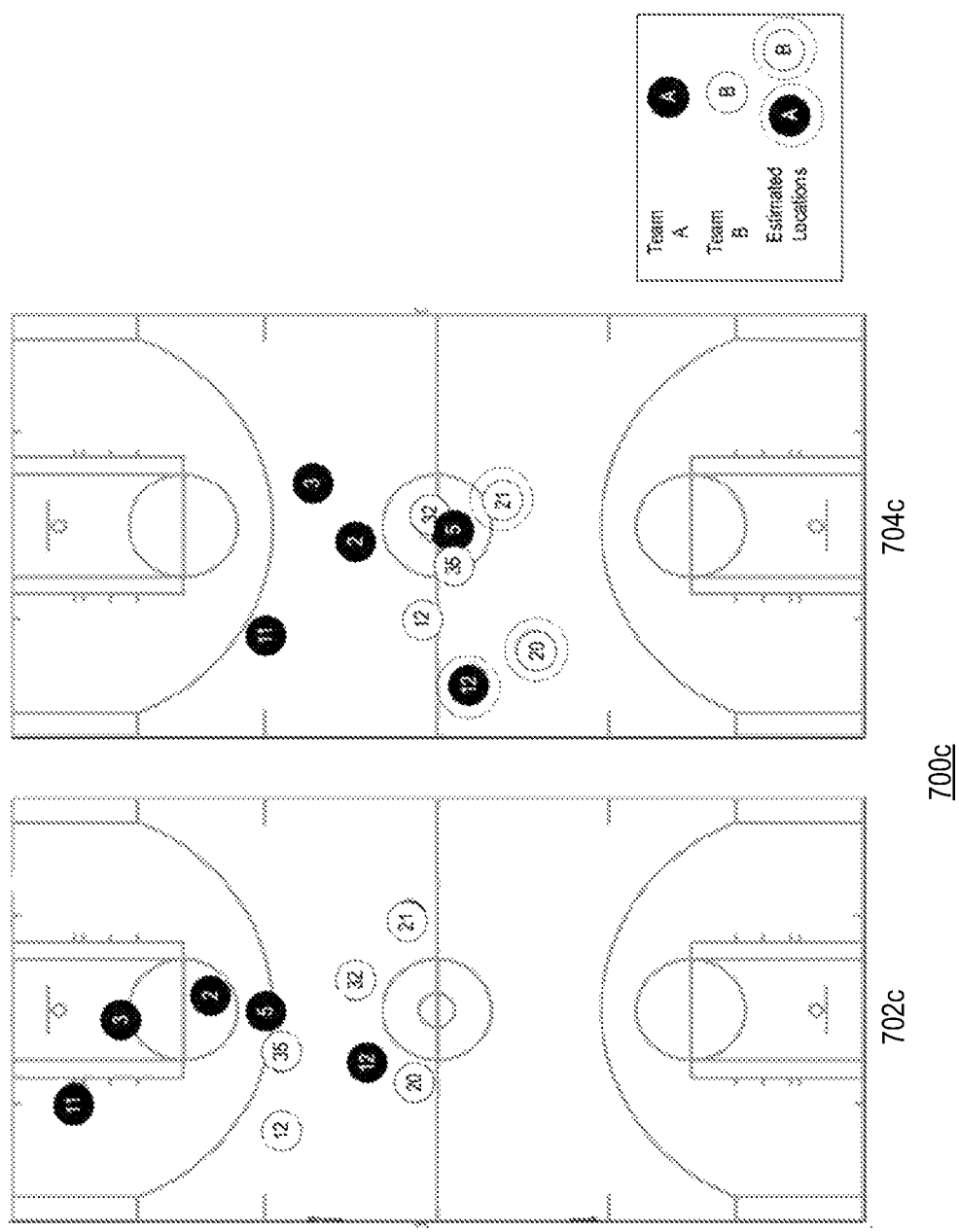
FIG. 7C illustrates an exemplary updated visualization of in-venue tracking and broadcast tracking, according to example embodiments.
Figure 7D:
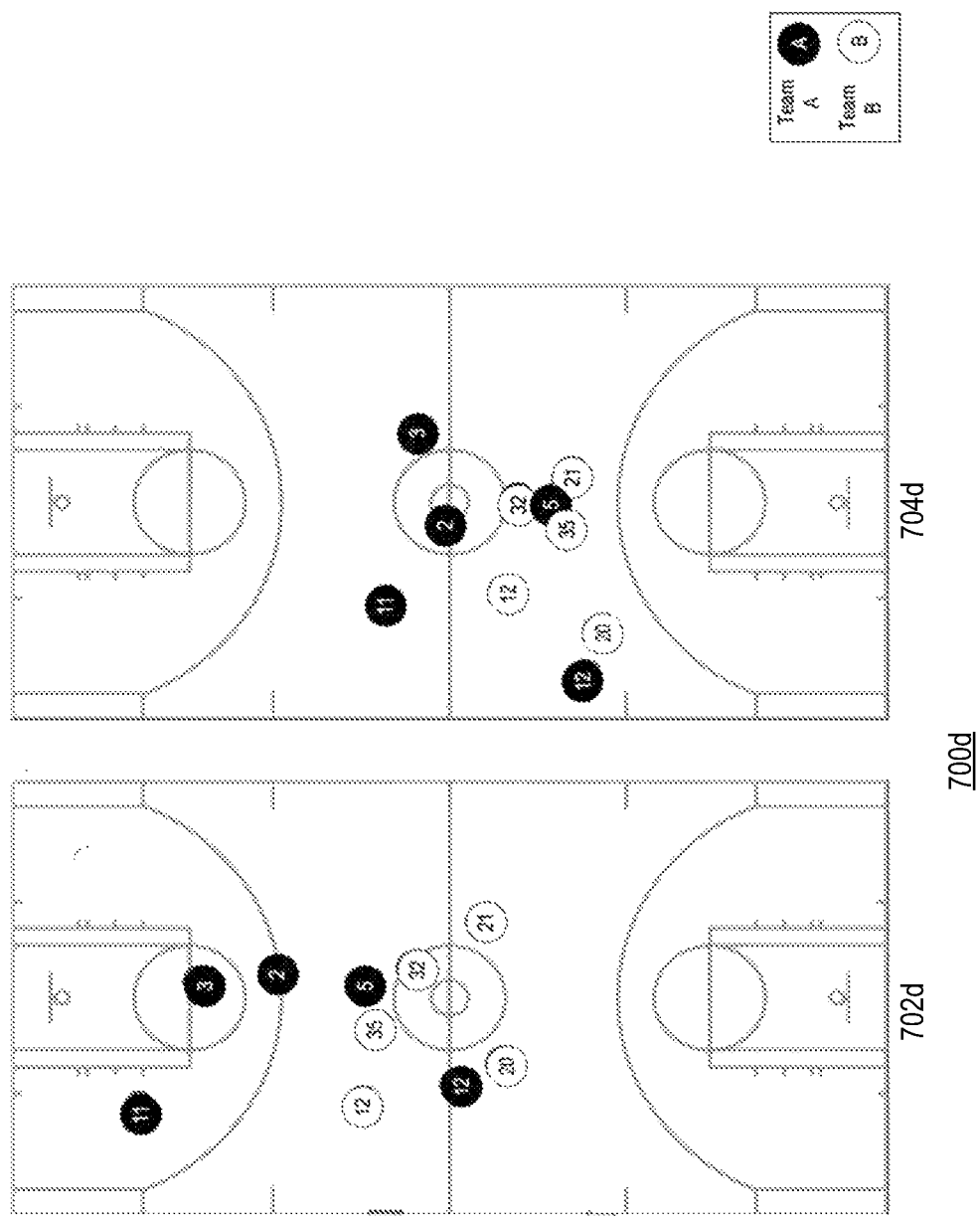
FIG. 7D illustrates an exemplary updated visualization of in-venue tracking and broadcast tracking, according to example embodiments.

FIG. 7A illustrates the visualization 700a showing the in-venue tracking 702a and the corresponding broadcast tracking 704a. The visualization 700a may correspond to a start of a possession and locations of all ten players are known for both in-venue tracking 702a and broadcast tracking 704a. FIG. 7B illustrates the updated visualization 700b during the possession. While the in-venue tracking 702b shows all ten players, the broadcast tracking is missing the following players: Team A (12) and Team B (12, 20, 21, 32, and 35). The prediction module 120 may estimate the locations of the missing players from the broadcast tracking 704b, and the estimated locations have been shown. FIG. 7C illustrates another updated visualization 700c during the possession. The updated in-venue tracking 702c shows locations of all ten players, but the updated broadcast tracking 704c is missing the locations of the players of Team A (12) and Team B (20, 21). The prediction module may estimate the missing locations, which have been shown the updated visualization 700c. FIG. 7D illustrates the updated visualization 700d at the end of the possession. As illustrated, both the updated in-venue tracking 702d and broadcast tracking 704d show the locations of all ten players. With regards to the estimated locations in broadcast tracking 704b and 704c, the estimation may be based on a spline model.

Figure 8A:
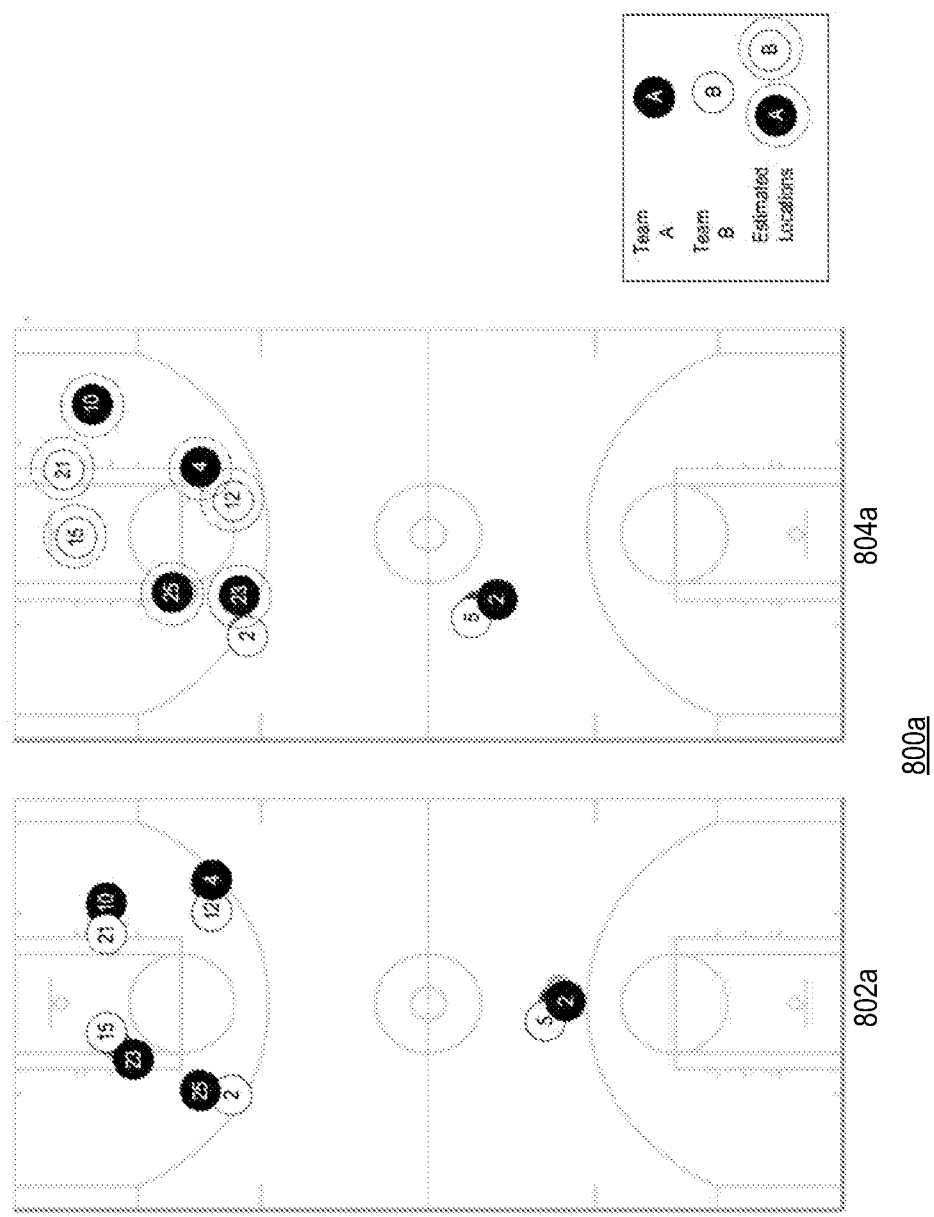
FIG. 8A illustrates an exemplary visualization of in-venue tracking and broadcast tracking, according to example embodiments.
Figure 8B:
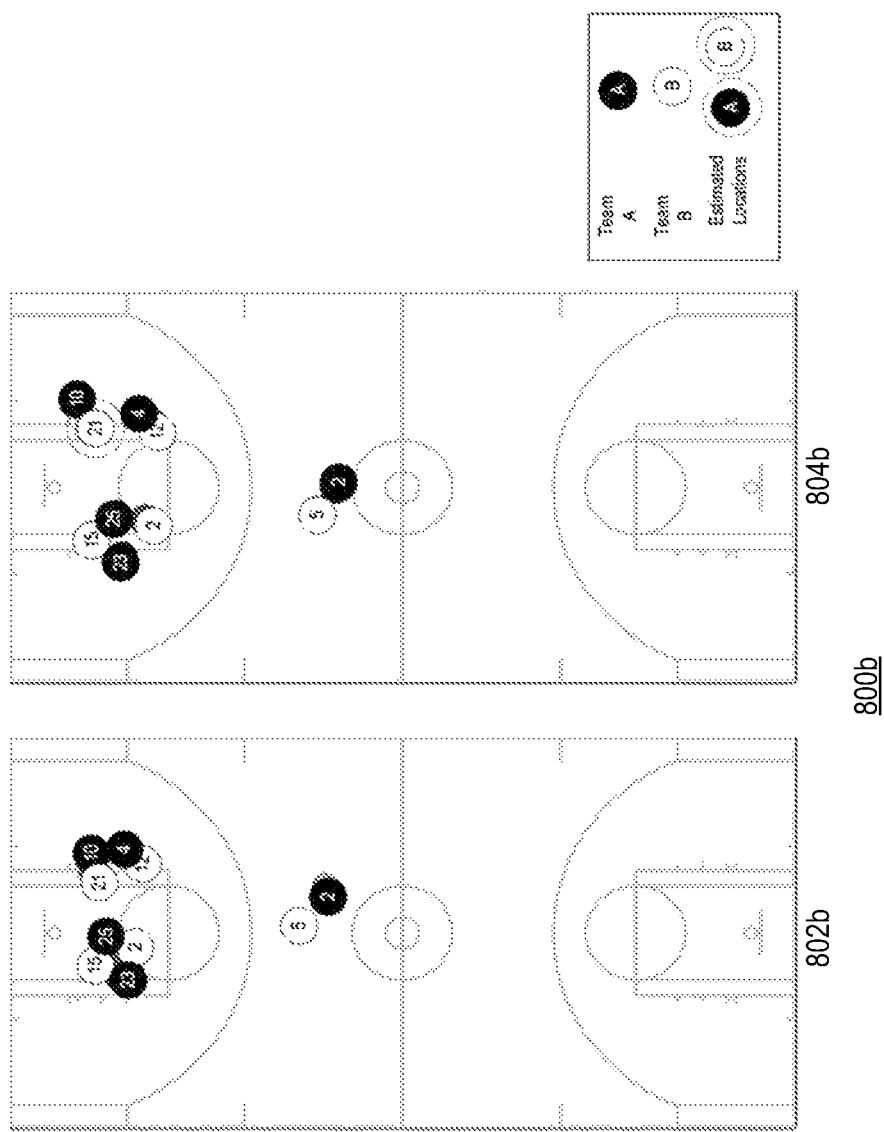
FIG. 8B illustrates an exemplary updated visualization of in-venue tracking and broadcast tracking, according to example embodiments.
Figure 8C:
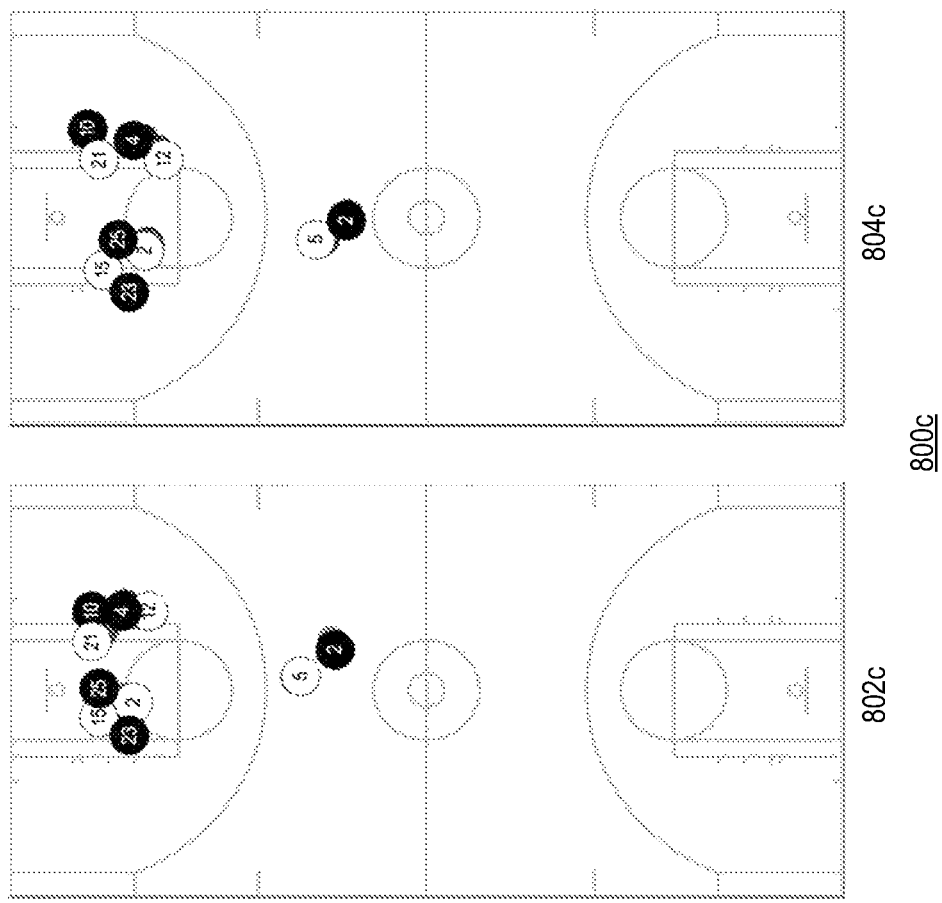
FIG. 8C illustrates an exemplary updated visualization of in-venue tracking and broadcast tracking, according to example embodiments.

FIGS. 8A-8C illustrate exemplary visualizations of estimated player locations for broadcast tracking, according to the example embodiments. Particularly, FIGS. 8A-8C illustrate visualizations 800a-800c showing a progression of player locations from a start of a possession to an end of the possession. In-venue tracking 802a-802c show the actual locations of the players and the broadcast tracking 804a-804c show the known locations of the players and the estimates of the unknown locations. As above, the visualizations 800a-800c may be presented as graphical user interfaces and/or may be representative of state of tracking data being processed.

FIG. 8A illustrates the visualization 800a at the start of the possession. The in-venue tracking 802a shows the known locations of all ten players. However, the broadcast tracking 804a may be missing the locations of the following players: Team A (5, 10, 23, and 25) and Team B (12, 15, and 21). The prediction module 120 may estimate the missing locations and the estimated locations are shown in the visualization 800a. FIG. 8B illustrates the updated visualization 800b during the possession. As shown, the updated in-venue tracking 802b shows the locations of all ten players. However, the updated broadcast tracking 804b is missing location of player 21 from Team B. The prediction module 120 may estimate the missing location, and the estimated location is shown in the updated visualization 800b. FIG. 8C illustrates the updated visualization 800c during the end of the possession. As shown, both the updated in-venue tracking 802c and the updated broadcast tracking 804c show the locations of all players. With regards to the missing locations in broadcast tracking 804a and 804b, the prediction module may use a nearest neighbor approach (e.g., a kNN) or any other type of machine learning model (e.g., an end-to-end deep neural network).

Figure 9A:
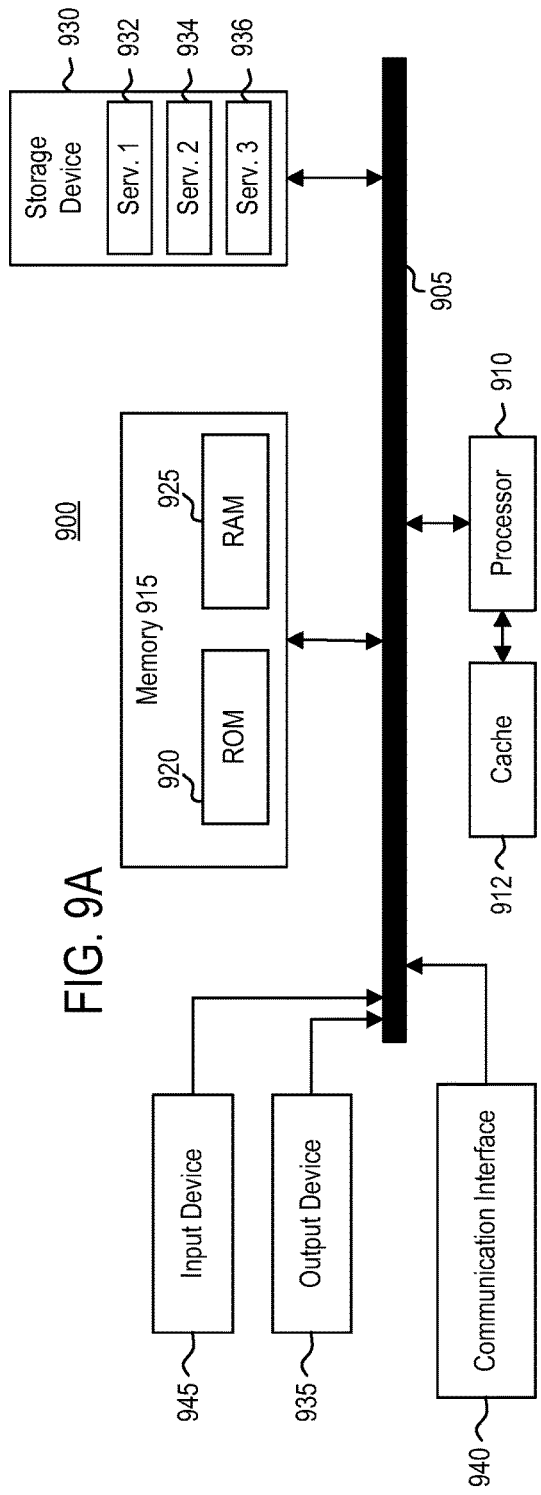
FIG. 9A is a block diagram illustrating a computing device, according to example embodiments.

FIG. 9A illustrates an architecture of computing system 900, according to example embodiments. System 900 may be representative of at least a portion of organization computing system 104. One or more components of system 900 may be in electrical communication with each other using a bus 905. System 900 may include a processing unit (CPU or processor) 910 and a system bus 905 that couples various system components including the system memory 915, such as read only memory (ROM) 920 and random access memory (RAM) 925, to processor 910. System 900 may include a cache of high-speed memory connected directly with, in close proximity to, or integrated as part of processor 910. System 900 may copy data from memory 915 and/or storage device 930 to cache 912 for quick access by processor 910. In this way, cache 912 may provide a performance boost that avoids processor 910 delays while waiting for data. These and other modules may control or be configured to control processor 910 to perform various actions. Other system memory 915 may be available for use as well. Memory 915 may include multiple different types of memory with different performance characteristics. Processor 910 may include any general purpose processor and a hardware module or software module, such as service 1 932, service 2 934, and service 3 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction with the computing system 900, an input device 945 may represent any number of input mechanisms, such as a microphone for speech, a touch-sensitive screen for gesture or graphical input, keyboard, mouse, motion input, speech and so forth. An output device 935 (e.g., display) may also be one or more of a number of output mechanisms known to those of skill in the art. In some instances, multimodal systems may enable a user to provide multiple types of input to communicate with computing system 900. Communications interface 940 may generally govern and manage the user input and system output. There is no restriction on operating on any particular hardware arrangement and therefore the basic features here may easily be substituted for improved hardware or firmware arrangements as they are developed.

Storage device 930 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 925, read only memory (ROM) 920, and hybrids thereof.

Storage device 930 may include services 932, 934, and 936 for controlling the processor 910. Other hardware or software modules are contemplated. Storage device 930 may be connected to system bus 905. In one aspect, a hardware module that performs a particular function may include the software component stored in a computer-readable medium in connection with the necessary hardware components, such as processor 910, bus 905, output device 935, and so forth, to carry out the function.

Figure 9B:
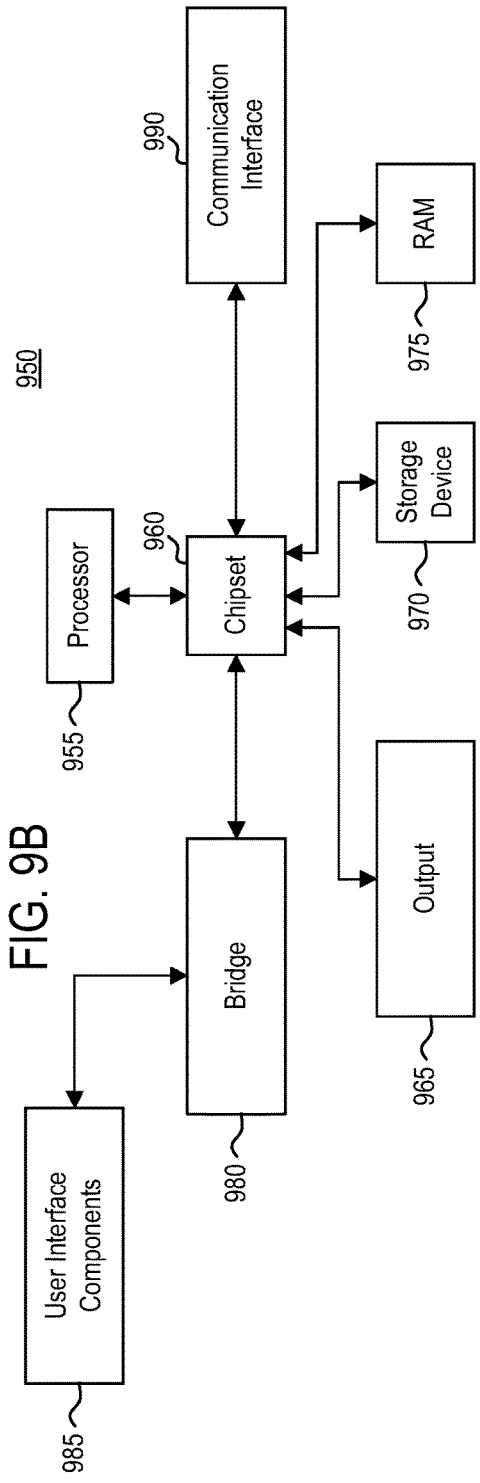
FIG. 9B is a block diagram illustrating a computing device, according to example embodiments.

FIG. 9B illustrates a computer system 950 having a chipset architecture that may represent at least a portion of organization computing system 104. Computer system 950 may be an example of computer hardware, software, and firmware that may be used to implement the disclosed technology. System 950 may include a processor 955, representative of any number of physically and/or logically distinct resources capable of executing software, firmware, and hardware configured to perform identified computations. Processor 955 may communicate with a chipset 960 that may control input to and output from processor 955. In this example, chipset 960 outputs information to output 965, such as a display, and may read and write information to storage device 970, which may include magnetic media, and solid-state media, for example. Chipset 960 may also read data from and write data to RAM 975. A bridge 980 for interfacing with a variety of user interface components 985 may be provided for interfacing with chipset 960. Such user interface components 985 may include a keyboard, a microphone, touch detection and processing circuitry, a pointing device, such as a mouse, and so on. In general, inputs to system 950 may come from any of a variety of sources, machine generated and/or human generated.

Chipset 960 may also interface with one or more communication interfaces 990 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 955 analyzing data stored in storage device 970 or RAM 975. Further, the machine may receive inputs from a user through user interface components 985 and execute appropriate functions, such as browsing functions by interpreting these inputs using processor 955.

It may be appreciated that example systems 900 and 950 may have more than one processor 910 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
receiving, by a computing system, broadcast video data corresponding to a sporting event and in-venue video data;
analyzing, by the computing system, the broadcast video data to determine whether the broadcast video data includes a known starting player location at a start of the possession and a known ending player location at an end of the possession;

generating, by the computing system, a prediction model based on the broadcast video data and the in-venue video data, wherein the generating includes selecting the prediction model type based on whether the broadcast video data include the known starting player location and the known ending player location;

receiving, by the computing system, video data with at least one missing player location corresponding to a possession of the sporting event;

estimating, by the computing system, via the prediction model, a player location corresponding to the at least one missing player location; and outputting, by the computing system, the estimated player location to a graphical user interface of a device.

2. The method of claim 1, the method further comprising:
utilizing, by the computing system, a machine learning model to minimize an error rate between an estimated location corresponding to the broadcast video data and a location in the in-venue video data.

3. The method of claim 1, wherein the broadcast video data includes tracking video data generated from the broadcast video data.

4. The method of claim 1, wherein the in-venue video data includes one or more player locations during the sporting event.

5. The method of claim 4, the method further comprising:
generating, by the computing system, at least one statistic based on the one or more player locations and the estimated player location.

6. The method of claim 1,
wherein the prediction model type includes at least one of: a spline model type, a deep neural network type, a machine-learning model type, an end-to-end deep neural network type, or a k-nearest neighbors type.

7. The method of claim 1, wherein the broadcast video includes live broadcast video stream data or recorded broadcast video data.

8. A system comprising:
a processor; and
a memory having programming instructions stored thereon, which, when executed by the processor, causes the system to perform operations comprising:
receiving broadcast video data corresponding to a sporting event and in-venue video data;
analyzing the broadcast video data to determine whether the broadcast video data includes a known starting player location at a start of the possession and a known ending player location at an end of the possession;
generating a prediction model based on the broadcast video data and the in-venue video data, wherein the generating includes selecting the prediction model type based on whether the broadcast video data include the known starting player location and the known ending player location;
receiving video data with at least one missing player location corresponding to a possession of the sporting event;
estimating, via the prediction model, a player location corresponding to the at least one missing player location; and
outputting the estimated player location to a graphical user interface of a device.

9. The system of claim 8, the operations further comprising:
utilizing a machine learning model to minimize an error rate between an estimated location corresponding to the broadcast video data and a location in the in-venue video data.

10. The system of claim 8, wherein the broadcast video data includes tracking video data generated from the broadcast video data.

11. The system of claim 8, wherein the in-venue video data includes one or more player locations during the sporting event.

12. The system of claim 11, the operations further comprising:
generating at least one statistic based on the one or more player locations and the estimated player location.

13. The system of claim 8, wherein the prediction model type includes at least one of: a spline model type, a deep neural network type, a machine-learning model type, an end-to-end deep neural network type, or a k-nearest neighbors type.

14. The system of claim 8, wherein the broadcast video includes live broadcast video stream data or recorded broadcast video data.

15. A non-transitory computer-readable medium storing computer-executable instructions which, when executed by at least one processor, cause the at least one processor to perform operations comprising:
receiving broadcast video data corresponding to a sporting event and in-venue video data;
analyzing the broadcast video data to determine whether the broadcast video data includes a known starting player location at a start of the possession and a known ending player location at an end of the possession;
generating a prediction model based on the broadcast video data and the in-venue video data, wherein the generating includes selecting the prediction model type based on whether the broadcast video data include the known starting player location and the known ending player location;
receiving video data with at least one missing player location corresponding to a possession of the sporting event;
estimating, via the prediction model, a player location corresponding to the at least one missing player location; and
outputting the estimated player location to a graphical user interface of a device.

16. The non-transitory computer-readable medium of claim 15, the operations further comprising:
utilizing a machine learning model to minimize an error rate between an estimated location corresponding to the broadcast video data and a location in the in-venue video data.

17. The non-transitory computer-readable medium of claim 15, wherein the broadcast video data includes tracking video data generated from the broadcast video data.

* * * * *